April 20, 1948.  C. W. GINTER  2,439,888
BEARING PACKER
Filed Nov. 22, 1943

INVENTOR.
Charles W. Ginter,
BY Bair & Freeman
Atty's.

Patented Apr. 20, 1948

2,439,888

UNITED STATES PATENT OFFICE 2,439,888

BEARING PACKER

Charles W. Ginter, Bryan, Ohio, assignor to The Aro Equipment Corporation, Bryan, Ohio, a corporation of Ohio Application November 22, 1943, Serial No. 511,305

3 Claims. (Cl. 184—1)

My present invention relates to a bearing packer of the general kind shown in my Patent No. 2,270,754, issued January 20, 1942, the present invention relating particularly to an improvement thereover.

One object of the present invention is to provide a locking means for locking together the two elements of the packer between which the bearing is positioned so that it is unnecessary to hold them together as by pressure of a grease gun thereon as in my former patent.

A further object is to provide a bearing packer having most of the parts readily formed of sheet metal and which is inexpensive to manufacture and simple to fabricate.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1:
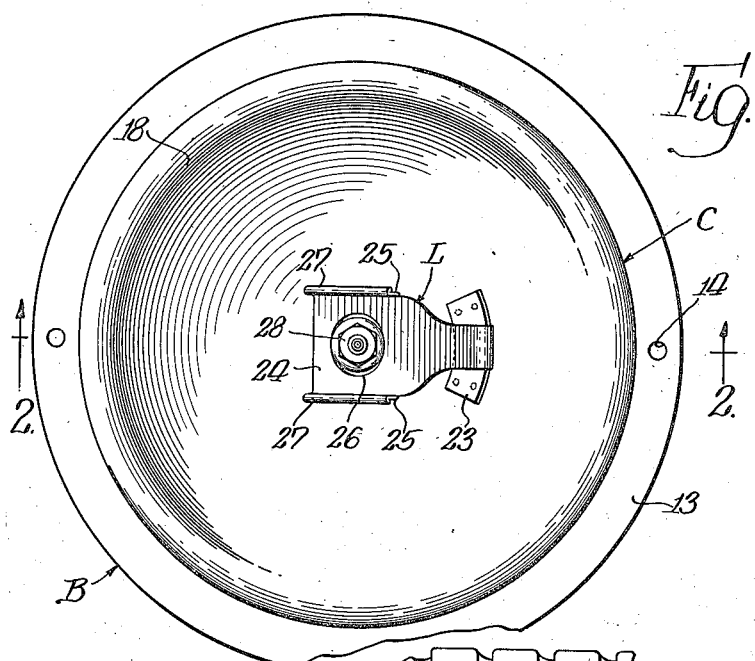
Figure 1 is a plan view of the bearing packer embodying my invention.

My bearing packer comprises in general a base B, a stem S and a closure member C. The base B consists of a sheet of metal formed into a tubular supporting flange 10, an inwardly and downwardly sloping conical seating flange 12, and an out-turned flange 13. The flange 13 is perforated as at 14 for the purpose of inserting screws or bolts to rigidly mount the bearing packer on a work bench or other suitable support if desired.

The stem S is a tubular rod, the bore of which is shown at 15 and the lower end is shouldered down to pass through a central opening of the seating flange 12 after which it is held in assembled position by peening the lower end as illustrated at 16. Lateral passageways or ports 17 extend from the bore 15 adjacent the seating flange 12.

The closure member C is likewise conical in shape, but preferably of a sharper angle. It has a reinforcing flange 18 around the upper outer edge. At the center is a tubular flange 19 to fit around the stem S for free sliding movement thereon. Both of the cones B and C may be inexpensively manufactured by stamping them from sheet metal.

The lower face of the cone C is adapted to engage the inner race 20 of a bearing assembly. The bearing assembly includes rollers 21 and an outer cage 22. The bearing shown on the drawing is merely for the purpose of illustration whereas my structure is adapted to lubricate ball bearings including both the inner and outer races thereof, thrust bearings and equivalent types of bearing assemblies.

Figure 3:
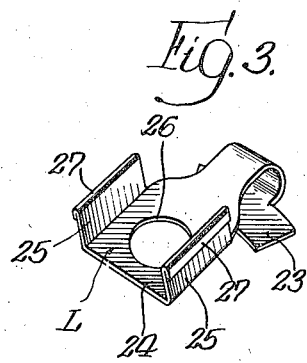
Figure 3 is a perspective view of the lock means forming the main feature of my present invention.

In connection with the cone C, I provide a locking element L made of hardened spring steel or the like and of the shape shown in Figure 3. A base flange 23 thereof is adapted to be secured to the cone C as by spot-welding or the like. The lock element L includes three other flanges 24, 25 and 25. The flange 24 is perforated at 26, the size of the perforation being slightly larger than the outside diameter of the stem S. The flanges 25 are doubled over as indicated at 27 for convenience in manipulation as will hereinafter appear.

The upper end of the bore 15 is adapted to receive a regulation grease reception fitting 28 with which a coupler 29, for instance one end of a flexible metal hose 30, may be connected. The hose extends from a grease gun or other source of lubricant under pressure (not shown).

Figure 2:
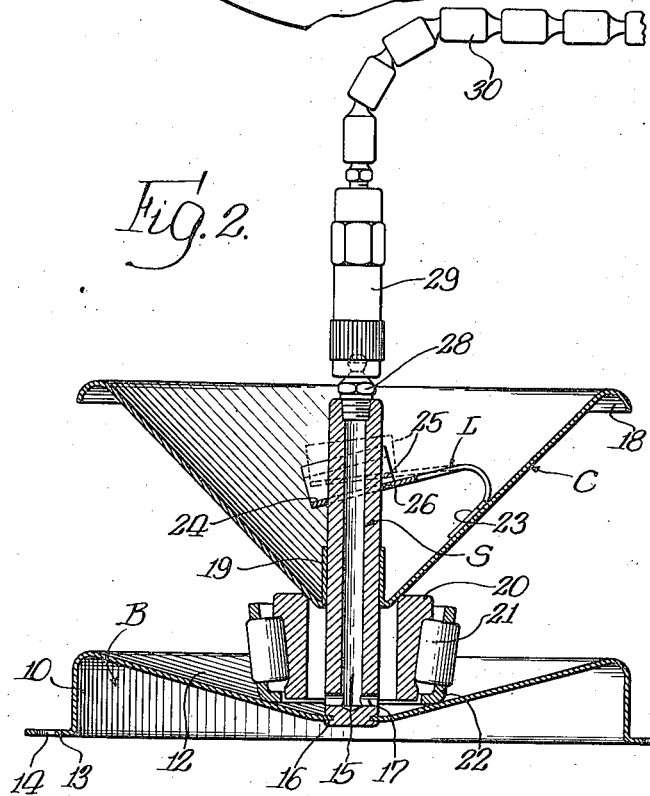
Figure 2 is a vertical sectional view thereof on the line 2—2 of Figure 1 showing a bearing in position for being lubricated and a flexible metal hose of a grease gun applied to the bearing packer.
Figure 4:
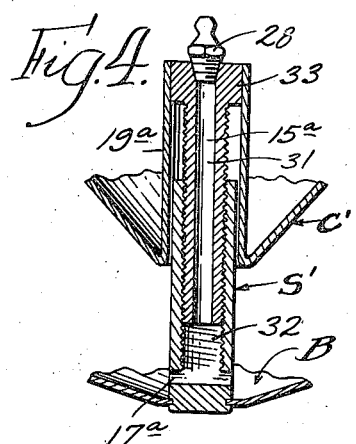
Figure 4 is a sectional view of a modified form of the invention.

In Figure 4 I show a modification wherein a screw threaded means serves as a clamp for holding the cone C' in a predetermined relation to the base B, that is against the bearing as in Figure 2. In this case a stem S' is provided which is internally screw threaded as indicated at 32. The hub of the cone C' is shown at 19$^a$ and extends higher than in Figure 2. Its upper end is brazed or otherwise suitably secured to a head 33 of a threaded stem 31. The stem 31 has a bore 15$^a$ communicating with the threaded bore 32 and the threaded bore in turn has outlet ports 17$^a$ to the bearing. The fitting 28 is screwed into the bore 15$^a$ for introducing lubricant from the hose to the bearing packer.

*Practical operation*

In the operation of my bearing packer, as shown in Figures 1, 2 and 3, the bearing assembly 20—21—22 is placed over the stem S after the closure member C is removed therefrom. The closure member is then placed on the stem and forced down against the inner race 20 to the position shown so that the bearing assembly is sealed relative thereto, and relative to the seating flange 12 through its contact with the outer cage 22. The locking element L is under tension to swing downwardly in Figure 2 and therefore any sliding downward of the cone C will permit the locking element to slide along the stem S without gripping it as the direction of drag will be such as to tend to loosen the locking element relative to the stem. Any attempt to move the cone C upwardly, however, will be resisted by the locking element as it will then grip the stem and thus the cone C is automatically locked down against the bearing assembly by merely pushing the cone thereagainst.

The bearing may then be lubricated by attaching the coupling 29 to the fitting 28 and operating the grease gun to supply lubricant to the bore 15. Such lubricant first fills the race 20 then engages the seating flange 12, and finally passes into the interstices between the races 20 and 22 and around the rollers 21.

When the lubricant begins to squeeze out around the rollers through the slots therefor in the cage 22, and overflows from the spaces above the rollers between the elements 20 and 22, the operator knows that the bearing has been sufficiently lubricated and can stop feeding lubricant thereto. Thereafter the coupler 29 may be disconnected and the cone C removed by grasping the flanges 25 of the locking element L between the thumb and forefinger to lift the locking element to released position as shown dotted in Figure 2. The cone C may thereupon be removed from the stem S. The lubricated bearing assembly may then be removed from the stem S and placed into its outer race with assurance that the bearing will be sufficiently lubricated throughout with enough surplus lubricant for the shaft or spindle on which the bearing is mounted and for the surrounding interior of the bearing housing.

My present invention, as will be obvious from the foregoing, makes it unnecessary to utilize the grease gun as a holddown means for the cone C during the greasing operation as disclosed in my Patent No. 2,270,754. It is therefore possible to use a flexible hose or other means of grease transmission in connection with the present packer.

In the operation of the Figure 4 form of device, the cone C' is entirely unscrewed from the stem S' in order to place the bearing in position, and is then rethreaded into the stem until the bearing is engaged tightly by the base B and the cone C'. The threaded connection thereby forms a substitute for the clamp or latch L of Figures 1, 2 and 3 and accomplishes the same results, i. e., sealing of the bearing relative to the bearing packer so that the bearing can be packed with lubricant.

Having described two specific embodiments of my invention together with the operation thereof, I desire it to be understood that these forms are selected merely for the purpose of facilitating disclosure of the invention rather than for the purpose of limiting the number of forms which it may assume. It is to be further understood that various modifications, adaptations and alterations may be applied to the specific forms disclosed to meet the requirements of practice without in any manner departing from the spirit and scope of the present invention except as set forth in the claims appended hereto.

I claim as my invention and desire to secure by Letters Patent of the United States:

1. A lubricating device for bearing assemblies comprising a bearing supporting member including a dished base member and a central and vertically disposed stem mounted rigidly with respect to said base member, a conical bearing closure member slidably mounted on said stem for engaging the upper end of the bearing assembly to grip it on said base member during the lubricating operation, said conical member being adapted to seal the central opening of the bearing assembly against discharge of lubricant therefrom, and clamp means engaging said stem and interposed between it and said closure member for retaining the closure member in position against the force of the lubricant entering the bearing, said clamp means comprising a member having a hole slightly larger than said stem and means constraining said last named member to tilt from a position at right angles to said support.

2. In a device for supplying lubricating fluids under pressure to bearings, a sheet metal support for a bearing, a sheet metal closure for the bearing, said closure cooperating with one end of the bearing and said support cooperating with the other end thereof, means for supplying lubricant to the bearing between said support and said closure, and clamp means adapted to cooperate with said support to retain said closure in position cooperating with the bearing and the bearing in position on said support during supply of lubricant to, and build-up of the pressure of the lubricant within the bearing, said clamp means comprising a sheet metal element having a hole slightly larger than at least a portion of said support and means constraining said element to tilt from a position at right angles to said support.

3. A lubricating device for bearing assemblies comprising a bearing supporting member including a dished base member and a central and vertically disposed stem mounted rigidly with respect to said base member, a conical bearing closure member slidably mounted on said stem for engaging the upper end of the bearing assembly to seat it on said base member during the lubricating operation, said conical member being adapted to seal the central opening of the bearing assembly against discharge of lubricant therefrom, and clamp means engaging said stem and interposed between it and said closure member for retaining the closure member in position against the force of the lubricant entering the bearing, said clamp means comprising sheet metal forming a flange secured to the inside of said conical member, a pair of reinforcing and manipulating flanges upturned from a substantially flat portion of said clamp means, said flat portion having a hole therein slightly larger than said stem and means constraining said flat portion to tilt from a position at right angles to said stem, to tightly clamp the conical member in the position desired.

CHARLES W. GINTER.

REFERENCES CITED

The following references are of record in the file of this patent:

UNITED STATES PATENTS

| Number | Name | Date |
|---|---|---|
| 87,715 | Sible | Mar. 9, 1869 |
| 860,816 | Marcum | July 23, 1907 |
| 2,209,495 | Scholfield | July 30, 1940 |
| 2,210,478 | Berg | Aug. 6, 1940 |
| 2,248,940 | Berg | July 15, 1941 |